United States Patent [19]

Bramson et al.

[11] 4,124,843
[45] Nov. 7, 1978

[54] MULTI-LINGUAL INPUT KEYBOARD AND DISPLAY

[75] Inventors: Harvey G. Bramson, Framingham; Charles W. Ying, Andover, both of Mass.

[73] Assignee: Atex Corporation, Bedford, Mass.

[21] Appl. No.: 792,714

[22] Filed: May 2, 1977

[51] Int. Cl.² .................. G06K 15/20; G06F 3/14
[52] U.S. Cl. ........................... 340/337; 400/63; 400/83; 400/109; 340/365 R; 364/900
[58] Field of Search ............. 340/337, 365 R, 365 S, 340/365 C; 364/200, 900; 197/1 R, 1 A

[56] References Cited

U.S. PATENT DOCUMENTS

| | | | |
|---|---|---|---|
| 3,187,321 | 6/1965 | Kameny | 340/365 R |
| 3,778,819 | 12/1973 | Bhagawan et al. | 340/365 S |
| 3,893,558 | 7/1975 | Fulton et al. | 197/1 R |
| 3,927,752 | 12/1975 | Jones et al. | 197/98 |
| 3,942,175 | 3/1976 | Collins et al. | 340/365 R |
| 3,964,591 | 6/1976 | Hill et al. | 197/1 R |

*Primary Examiner*—David L. Trafton
*Attorney, Agent, or Firm*—Cesari and McKenna

[57] ABSTRACT

A data entry device with a keyboard for use with a data processing system. A first data set of input keys are arranged in a standard typewriter configuration. A second set of keys comprises additional rows of data input keys that enable the operator to enter various special characters or symbols that are encountered in different languages. One row of keys in the first set constitutes a variable row. A legend corresponding to a selectable set of symbols is juxtaposed to the variable row. An operator can select a set of characters so that each input key in the variable row thereafter functions to identify the character designated in a corresponding position of the juxtaposed legend.

17 Claims, 10 Drawing Figures

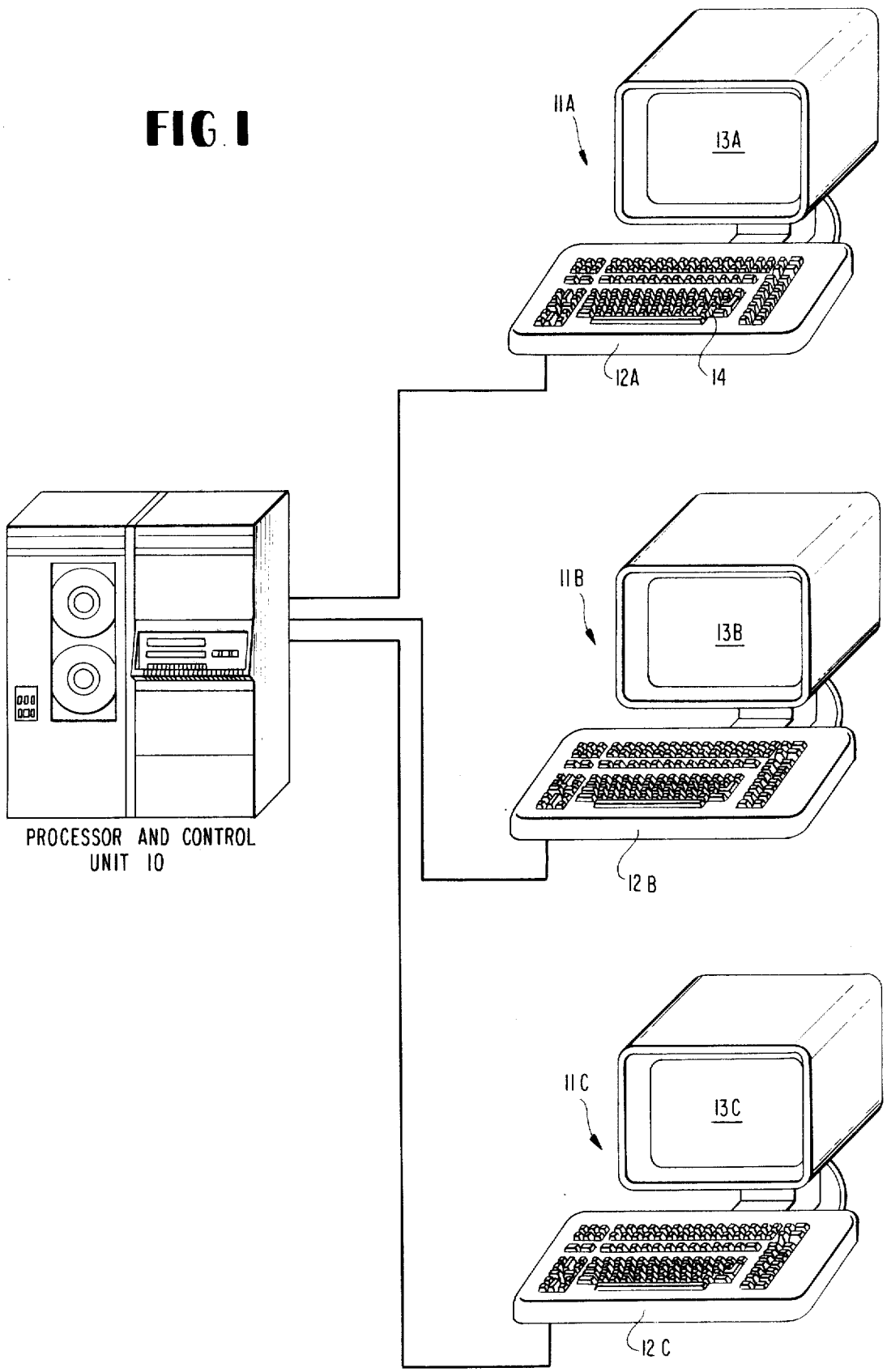

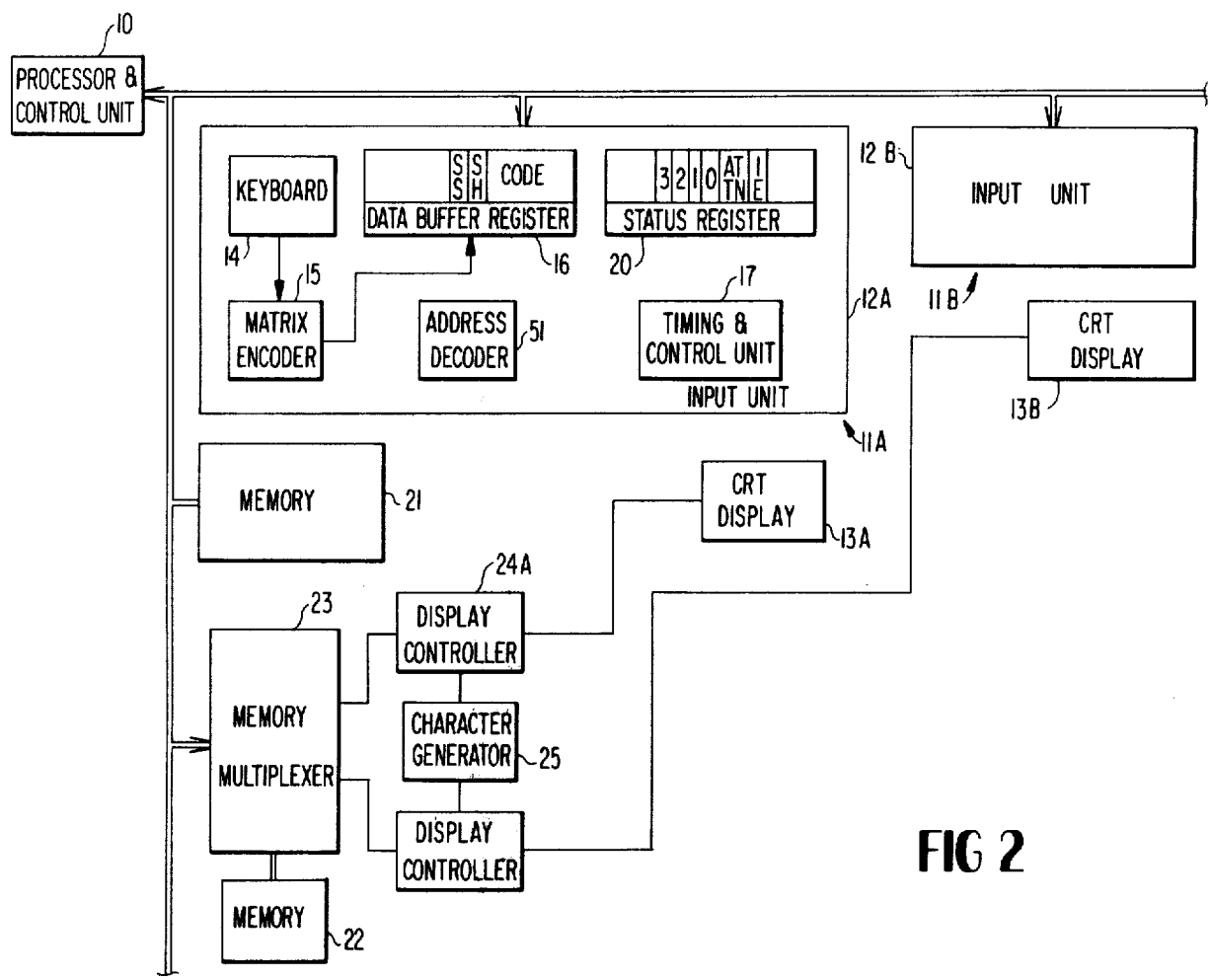

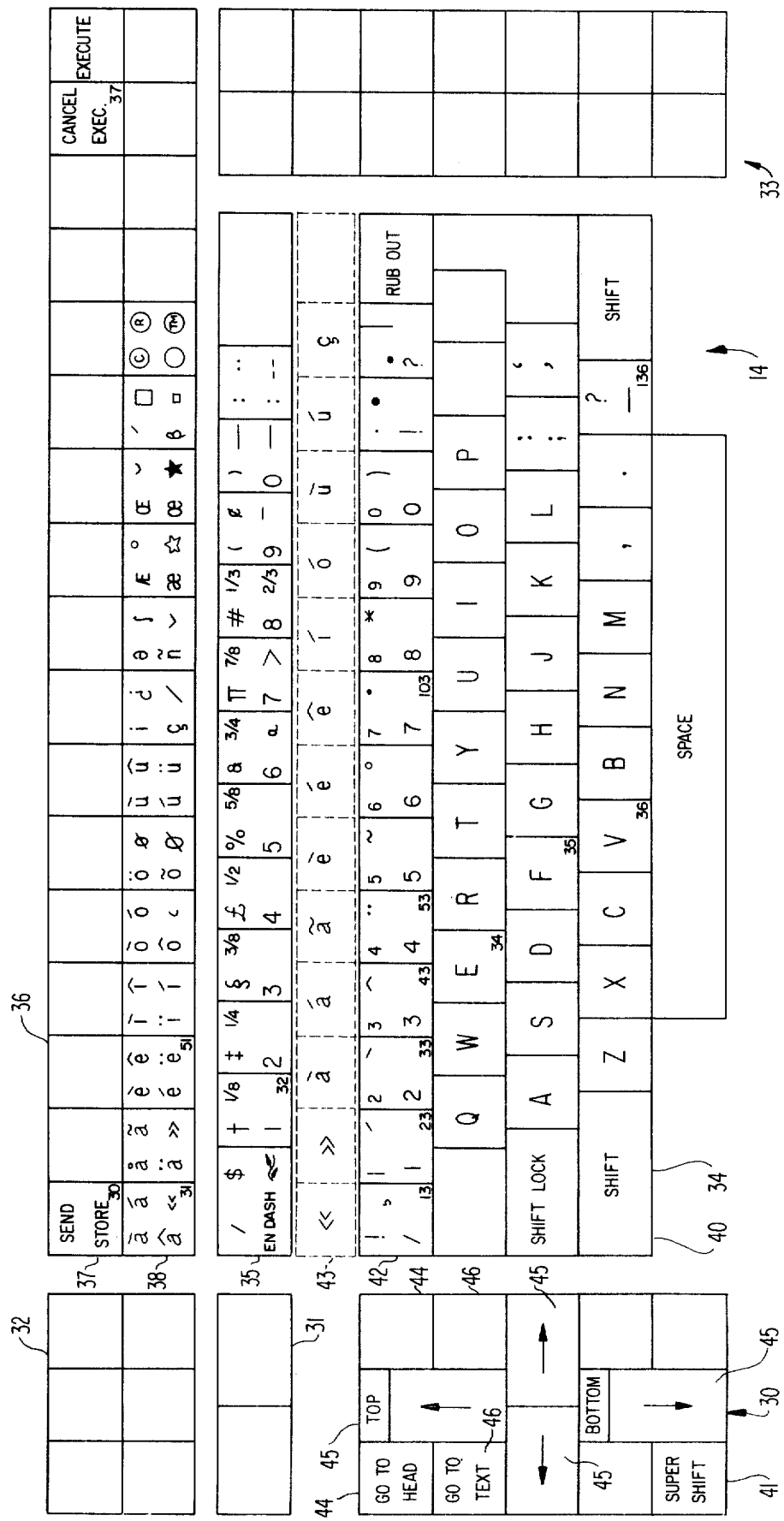

FIG 5

| ADDRESS | | | CONTENTS |
|---|---|---|---|
| SSS | SH | KEY NO | KEY CODE TABLE |
| 0 | 0 | 30 | STORE* |
| 0 | 1 | | STORE* |
| 1 | 0 | | SEND* |
| 1 | 1 | | SEND* |
| 0 | 0 | 31 | CIRA |
| 0 | 1 | | GRVA |
| 1 | 0 | | ACUTA |
| 1 | 1 | | FROPN |
| 0 | 0 | 32 | ONE |
| 0 | 1 | | DAGGER |
| 1 | 0 | | FRAC18 |
| 1 | 1 | | FRAC18 |
| 0 | 0 | 33 | VAR33* |
| 0 | 1 | | SUP2 |
| 1 | 0 | | GRAVE |
| 1 | 1 | | GRAVE |
| 0 | 0 | 34 | LE |
| 0 | 1 | | E |
| 1 | 0 | | SUPE |
| 1 | 1 | | SUPE |
| 0 | 0 | 35 | LF |
| 0 | 1 | | F |
| 1 | 0 | | LF |
| 1 | 1 | | F |
| 0 | 0 | 36 | LV |
| 0 | 1 | | V |
| 1 | 0 | | LV |
| 1 | 1 | | V |
| 0 | 0 | 37 | CANEXEC* |
| 0 | 1 | | CANEXEC* |
| 1 | 0 | | CANEXEC* |
| 1 | 1 | | CANEXEC* |

CENTRAL EDITOR — 50

| ADDRESS | CONTENTS |
|---|---|
| STORE | STORE SUBROUTINE |
| SEND | SEND SUBROUTINE |
| VAR13 | VAR13 SUBROUTINE |
| VAR23 | VAR23 SUBROUTINE |
| VAR33 | VAR33 SUBROUTINE |
| VAR43 | |

| | | |
|---|---|---|
| 1 0 | BASE 23 | |
| 1 1 | | |
| 0 0 | BASE 33 | TWO |
| 0 1 | | UMA |
| 1 0 | | UMA |
| 1 1 | | ACUTA |
| 0 1 | BASE 43 | |
| 1 0 | | |

| ADDRESS | CONTENTS |
|---|---|
| USER 1 | KEYBOARD LANGUAGE INDEX |
| USER 2 | KEYBOARD LANGUAGE INDEX |
| USER 3 | |

```
MOV R1, (SP)+
MOV R2, (SP)+
MOV R3, (SP)+

MOV DBR R1

MOV SR, R2
AND #R7, R2
  007700
MOV R2, SR

MOV (R1), R1
MOV R1, R3

AND #R7, R1
  000001
BLE +2
JSR R5, (R3)
JUMP +4

DEC R3
ASR R3

MOV R3, DISPLAY

MOV -(SP),R3
MOV -(SP),R2
MOV -(SP),R1
RTI
```

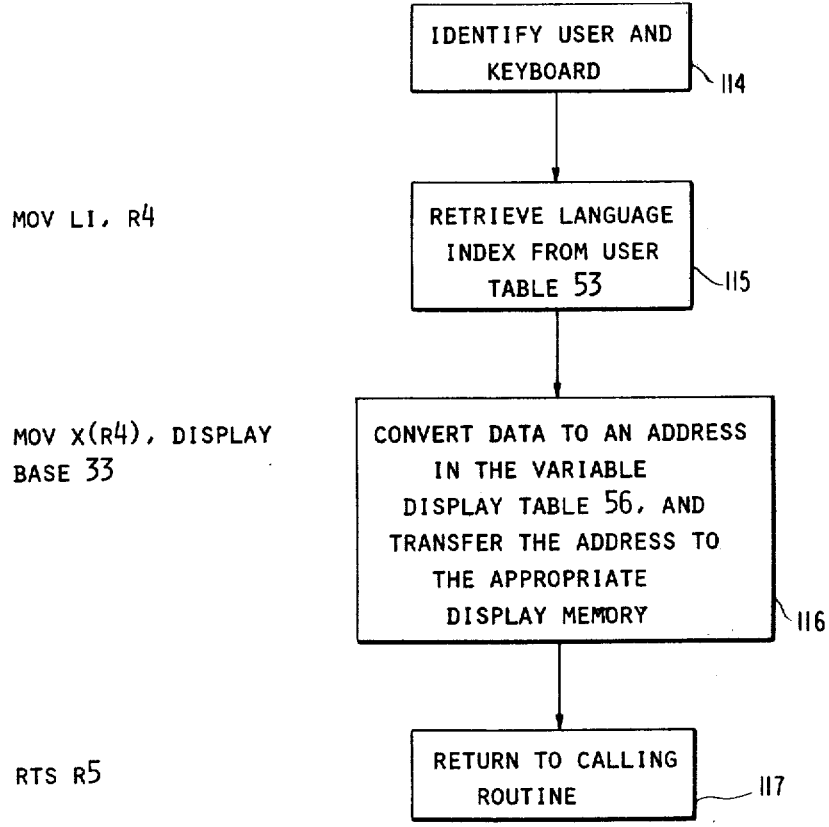

MULTI-LINGUAL INPUT KEYBOARD AND DISPLAY

CROSS REFERENCES TO RELATED U.S. PATENT APPLICATIONS AND PATENTS

U.S. patent application Ser. No. 717,000 filed Aug. 23, 1976 and issued Nov. 8, 1977 as U.S. Pat. No. 4,057,849 for a Text-Editing and Display System which is assigned to the same assignee as this invention;

U.S. patent application Ser. No. 710,220 filed July 30, 1976 for a Text-Editing and Display System Having Grouped Displays which is assigned to the same assignee as this invention; and U.S. Pat. No. 3,980,994 issued Sept. 14, 1976 for a Text-Editing and Display System Having a Text Insert Capability which is assigned to the same assignee as this invention.

BACKGROUND OF THE INVENTION

This invention generally relates to devices for entering data into a data processing system and more specifically to a data entry device that uses a keyboard for entering textual materials into a text-editing system.

Keyboard data entry devices, such as teletypewriters, constitute one of several classes of data entry devices for data processing systems. They are used by both sophisticated and non-sophisticated users of data processing system in a wide variety of data processing applications. Their acceptance is due, in large part, to the basic similarity between their keyboards and conventional typewriter keyboards. The keyboards in these data entry devices differ from conventional typewriter keyboards mainly by the addition of a few control keys that are necessary for the data entry device to function properly in a data processing environment.

In certain applications, however, keyboard data entry devices have limitations. Like a conventional typewriter, each keyboard usually is limited to a predetermined set of symbols or characters. Normally, the set of symbols corresponds to a particular language (e.g., English, French or German). It is therefore difficult to utilize a keyboard data entry device constructed for entering data in one language (e.g., English) for entering data in another language (e.g., French). One such application is text-editing, in which a text-editing system operates under the control of a data processor. These systems are gaining increasing acceptance for use in the publication of various books and periodicals. While initially these systems operated in a single language, publishers and other users of text editing systems are finding it very desirable to have a capability of editing text in one or more diverse languages simultaneously. Based upon the state of the existing art, we see three obvious approaches that can be taken to provide this capability.

In one such approach, a text editing system includes a number of separate data entry devices, and each device is structured for only a single language or group of related languages that are within the capability of the text editing system. In operation, an operator strikes a data input key. A matrix encoder in the device then generates a key code which is transferred to a data processor. The data processor "knows" the language for the data entry device and converts the key code into an appropriate character code for display and text editing purposes.

Although this represents a straight-forward technical approach, systems utilizing data entry devices of this type can become expensive if they have the capability to operate with a wide variety of languages. Specifically, the number of data entry devices depends upon the number of different languages and the peak number of users for each language. For example, assume that a text editing system has the capability of editing English, French and German text. Also assume that there are 30 persons who will enter text and that ten persons enter text in each of the three languages. Moreover, assume that it desirable to allow the ten operators associated with one language to edit text simultaneously. Under these conditions, the system would have to include thirty data entry devices, even though the total number of operators entering text in all languages might never exceed 15. Under this example, the expense of the text editing system is increased by the direct costs of 15 additional terminals plus any added costs that might be necessary to support a system of that size.

A second potential approach involves the use of so-called "intelligent terminals". An intelligent terminal normally comprises an input keyboard, a visual display device and a terminal data processor. The terminal data processor enables the terminal to control its own display and to perform text editing functions. Typically, a number of intelligent terminals connect to a central data processor that interacts with the terminal processors only to change the information being stored at the terminals. In a text editing application involving multiple languages, an operator would designate a language and the central and terminal data processors would interact to transfer to the terminal the necessary information to support that language. If it were necessary to type a phrase in another language, the operator would have to stop and request a change in language, type the phrase and then request a change back to the original language.

The use of intelligent terminals in a multiple language environment also has other limitations. The system limits each terminal to processing materials in one language at any given time. Interaction between the central and terminal data processors for changing a language, even for a short insert, can unnecessarily burden the central data processor and detract from the overall operating efficiency of the text editing system. Moreover, intelligent terminals normally have standard keyboards, so it is difficult to denote any change in the meaning of any particular data input key or group of keys. Finally, the overall costs of such text editing systems can increase dramatically over the comparable costs of text editing systems that utilize a central data processor to perform all the text editing functions as described in the foregoing U.S. patents and patent applications.

The third possible approach is compatible with the text editing system described in the foregoing U.S. patents and patent applications. This approach minimizes the problems involved in the first two approaches, but it has its own limitations. A data entry device comprises a universal keyboard with the additional keys necessary to provide the various special characters encountered in diverse languages. For example, é and è keys would be added if French text were to be entered; and ü and ë keys, for German text. In one embodiment, these special characters could be entered by means of added keys positioned outside the area required by the standard typewriter keyboard for English. Alternatively, special control keys could be used in conjunction with the standard data input keys, so each data input key could provide a number of different characters. However, this approach can reduce the overall efficiency of entering textual materials. For example, if an operator were entering French text, he would have to perform a special procedure or strike a special key outside the normal keyboard area each time one of the specific characters (e.g., é, è and á) were encountered in the text. As operators entering such text normally are touch typists, this approach can detract from their overall efficiency. For example, extra keys outside the standard keyboard area usually would be located outside the normal reach of the typist. Likewise, the special sequence would be an unnatural sequence. Thus, in order to find such a key, it would be necessary for the touch typist to revert to a "hunt and peck" approach to data entry. As apparent, this is a slower and less accurate method for entering data because the operator's eyes must shift from the work to the keyboard and back.

Therefore, it is an object of this invention to provide an improved keyboard data entry device for a data processing system.

Another object of this invention is to provide a data entry device with an input keyboard that enables an operator to select symbols from predetermined sets of symbols.

Still another object of this invention is to provide a data entry device with an input keyboard that is relatively easy to use in a text editing environment.

Yet another object of this invention is to provide a data entry device with an input keyboard that enables an operator to enter text in several languages into a data processing system more efficiently.

SUMMARY

In accordance with this invention, an operator uses a terminal with an input keyboard that includes fixed data input keys corresponding to predetermined symbols. Each fixed input key contains an identification of the symbol that will be displayed when the operator strikes that input key. There are also a plurality of variable data input keys. The operator can select a particular set of symbols thereby to assign a different symbol from the selected set to each of the variable keys. Thereafter when the operator strikes one of these variable data inputs keys, the corresponding symbol from the selected set is designated for display by the data processing system.

This invention is pointed out with the particularity in the appended claims. The above and further objects and advantages of this invention may be more readily understood by referring to the following detailed description taken in conjunction with the accompanying drawings.

BRIEF DESCRIPTION OF THE DRAWINGS

FIG. 1 depicts a text editing system adapted for utilizing this invention;

FIG. 2 is a block diagram of the text editing system shown in FIG. 1;

FIG. 3 is a detailed layout of an input keyboard in accordance with this invention that is adapted for entering text in several languages;

FIGS. 4A, 4B and 4C depict legends that can be attached to the keyboard shown in FIG. 3;

FIG. 5 is a memory map that designates various locations and the contents of those locations in a memory shown in FIG. 2;

FIGS. 6A and 6B are flow charts that depict one implementation of this invention.

DESCRIPTION OF AN ILLUSTRATIVE EMBODIMENT

Figure 6A:
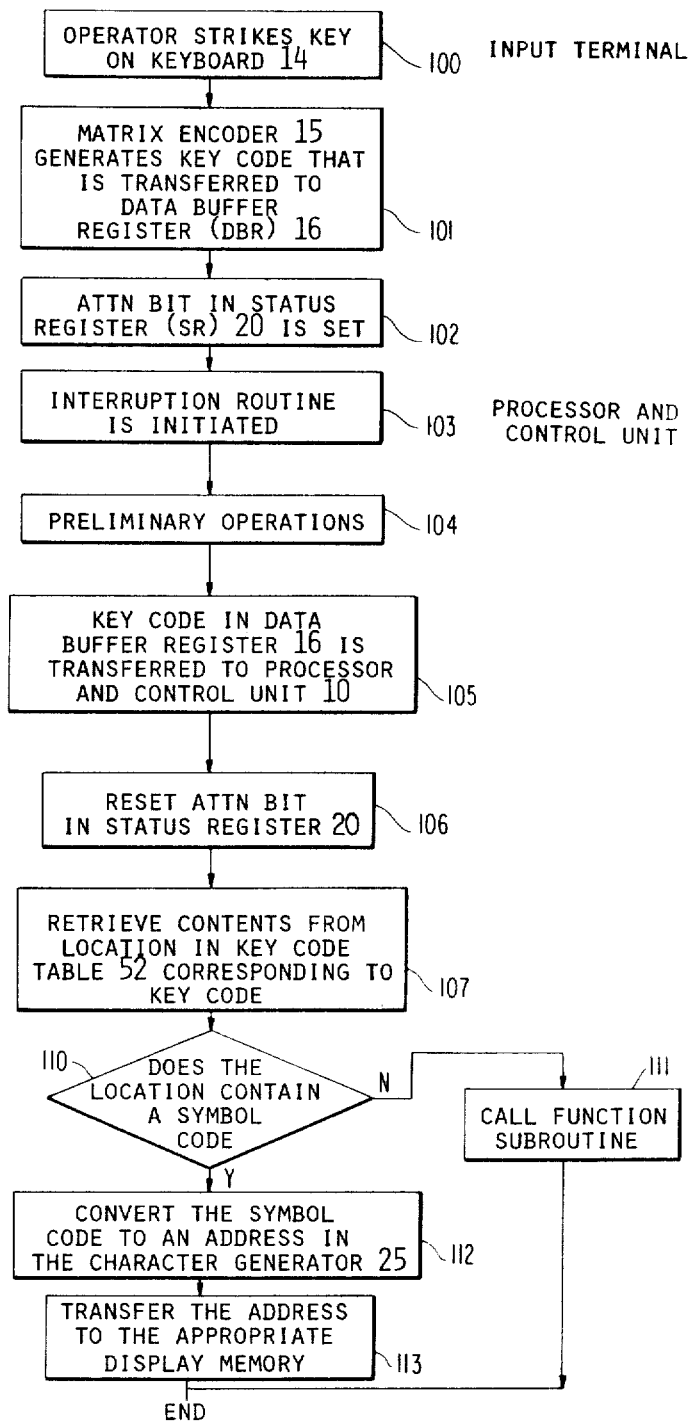

FIG. 1 depicts a text editing system that contains text editing stations structured in accordance with this invention. A processor and control unit 10 interacts with text editing stations 11A, 11B and 11C that comprise input units 12A, 12B and 12C and display units 13A, 13B and 13C, respectively. Although three such text editing stations are shown, a text editing system may comprise one or more such stations.

The general operation of a text editing station 11 and the processor and control unit 10 is described in the previously identified U.S. patents and applications. Generally, an operator enters text into the text editing system by typing on keys that comprise on input keyboard (e.g., keyboard 14 for input keyboard 12A). The processor and control unit 10 interacts with the input keyboard and a corresponding display screen to provide a visual display of the text on a CRT display screen (display screen 13A) or equivalent display. Once the text is edited completely, printing information defining column width, type size and type font is entered. In the system shown in FIG. 1, all the information is stored in a memory section of the processor and control unit 10, the memory section comprising random access memory units, direct access memory unit or both types of units.

FIG. 2 is a block diagram that represents a portion of the text editing system shown in FIG. 1 limited to text editing stations 11A and 11B. It is assumed, for purposes of this discussion, that the processor and control unit 10 comprises a PDP11 data processing system manufactured and sold by Digital Equipment Corporation. Referring specifically to input unit 12A, when an operator at the text editing station 11A strikes a key on the keyboard 14, a matrix encoder 15 generates a key code that corresponds to the position of the struck key and therefore identifies it. This key code is transferred to a CODE portion of a data buffer register 16 by a timing and control unit 17. In addition, further identifying information is transferred into SH and SS positions in the data buffer register 16. The SH position contains a ONE if the operator depresses a "shift" key while the SS position contains a ONE if the operator depresses a "super shift" key. These two control keys are described in more detail later.

Once the data buffer register 16 contains the key code and related information, the timing and control unit 17 sets an ATTN bit position in a status register 20, assuming an interrupt enable (IE) bit position contains a ONE. This causes the input unit to interrupt the processor and control unit 10.

Still referring to the status register 20, it contains a number of bits designated by numerals 0, 1, 2 and 3. In accordance with one embodiment of the text editing system, up to four text editing stations constitute a group and these numbered positions in the status register 20 identify to the processor and control unit 10 which of the four stations is involved in the interruption.

Once the processor and control unit 10 interrupts its operation, it performs an interruption routine contained in a memory 21. If the input unit 12A causes the interruption, then the interruption routine produces a transfer of data from the data buffer register 16 to the processor and control unit 10 for analysis and further action. If the operator types "a", the interruption routine transfers a character code for the letter "a" to a display memory 22 through a memory multiplexer 23 associated with the CRT display 13A at the text editing station 11A. During a succeeding refreshing operation, the character code in the memory 22 is tranferred through the display controller 24A which then converts the character code into dot information that produces the display of the character. The display controller 24A obtains this dot information from a character generator 25 that is shared by all the display controllers connected to the memory multiplexer 23. The foregoing operation is described in more detail in U.S. patent application Ser. No. 710,220.

FIG. 3 is a detailed view of a keyboard for a data entry device. The individual keys are orgainzed into blocks. Blocks 30, 31, 32 and 33 constitute blocks of control keys. Blocks 34 and 35 constitute data input keys that are for different characters or symbols. Block 36 contains an upper row 37 of keys that perform various control functions while a lower row 38 contains keys corresponding to various characters.

The specific characters shown in FIG. 3 constitute a set of characters that enable the entry of text in several languages. Specifically the operator can select English, Germanic or Romance language groups. This selection enables the operator to enter text in a variety of languages. More specifically, selection of the English group allows the entry of English and Indonesian text; the selection of the Germanic group, German, Dutch, Danish, Norwegian and Swedish text; and the selection of the Romance group, French, Portuguese, Spanish and Italian text.

Referring to row 38, each input key is divided into quadrants. The left-hand key (i.e., key 31) contains â in the lower left quadrant, à in the upper left quadrant, á in the upper right quadrant and < < in the lower right quadrant. The selection of a particular quadrant is controlled by a shift key 40 and a super shift key 41. Selection of upper and lower left-hand quadrants is controlled by the shift key 40 when the super shift key 41 is not active. When the super shift key 41 is depressed, the shift key 40 controls the selection of the upper and lower right-hand quadrants. Thus, to enter < < the operator depresses the super shift key 41 while leaving the shift key 40 in its normal position and then strikes key 31.

The addition of row 38 to the standard keyboard constituted by the block 34 provides a universal keyboard as described earlier. With this keyboard it is possible to enter text in any of the foregoing eleven languages. However, it now will be even more apparent that this does not facilitate the entry. For example, if French text is being entered the operator must perform a complex sequence of events to enter many of the standard French characters, such as ê. As a first step the operator must find the ê on key 51 in row 38. The next step is to ascertain and strike the necessary control keys for selecting the appropriate quadrant of key 51. In this case the operator must hold down the shift key 40 and the super shift key 41 simultaneously before striking key 51. As apparent, this sequence interrupts the natural typing flow of a touch typist.

Therefore, in accordance with this invention, an upper row 42 in the block 34 is a variable row. There is a space 43 between the row 42 and the block 35 that receives a legend, shown in phantom in FIG. 3. FIGS. 4A through 4C illustrate the various legends that can be located in the space 43. Specifically, FIG. 4A depicts a legend 43E for English language group. It contains a slash, numerals 1 through 0, an exclamation mark and a question mark. FIG. 4B depicts a legend 43G for the Germanic language group that contains a number of characters that are normally encountered during the entry of materials in the various Germanic languages. FIG. 4C depicts a legend 43R that corresponds to the special characters found in the Romance language group.

The operation of the keyboard shown in FIG. 3 in conjunction with the text editing system shown in FIG. 2 from the operator's standpoint can now be described. Assuming that the operator desires the enter French text, the Romance language group legend 43R in FIG. 4C is positioned by conventional means in the location 43 on the keyboard in FIG. 3. In the course of establishing operations with the text editing system, the operator depresses a GO TO HEAD key 44 (key 2) and then uses various "cursor" control keys 45 to position a "cursor" on a display screen at a position corresponding to a language selection field. Then the operator uses the block 34 of the keyboard to type FR, FRENCH or some other predetermined code that identifies the Romance language group. Alternatively, each user might be assigned a "default" language thereby to identify his normal language without the operator's having to identify it expressly.

The processor and control unit 10 shown in FIG. 2 reacts by establishing the necessary information for subsequently responding to typing on the keyboard shown in FIG. 3. Once this and other control information has been entered, the operator depresses GO TO TEXT key 46 to shift further operations into a text field on the display. Now the operator merely needs to depress key 103 in row 42 to type and display ê rather than perform the previously described multiple-step sequence.

As apparent from FIG. 4C, selection of the Romance language group assigns the commonly encountered characters in the French language and related languages to individual keys in row 42. Likewise, the selection of any other language group assigns commonly encountered characters in that group to individual keys in row 42.

The keys in row 42 in FIG. 3 constitute a row in a standard typewriter configuration and already contain permanent numeral markings on the key faces. The use of these markings is optional. However, their presence in FIG. 3 is included to underscore another point. These are the characters that normally are found on an English keyboard. However, they also are used in many other language groups, so they can not merely be eliminated. Thus, indicia of these characters are also located on other keys. More specifically, the slash and numerals 1 through 0 are also found in row 35; the exclamation point, in the shift position of key 13 in row 42; and the question mark, in the shift position of key 136 in the bottom row of the block 34. Likewise, the other characters that can be assigned to row 42 are duplicated on other keys.

This duplication of keys provides another advantage. Even though an operator is typing in one language, he can enter text in another language without having to change any control information. More specifically, if the operator were typing in French and encountered a German title, all the necessary special German characters could be typed by striking keys in row 38. Although this entails the use of the previously described complex procedure, the entry of text in a secondary language is an exception rather than a rule; so the interruption and inefficiency can be tolerated. If a large insert must be made in a secondary language, the operator always has the option of changing the control information and legend thereby selecting another set of symbols for assignment to the keys in the variable row 42.

Therefore, the keyboard shown in FIG. 3 provides a number of advantages to the user over the prior art data entry devices. As shown specifically in FIG. 2, this data entry device is relatively simple and inexpensive. As each keyboard has the capability for entering text in a number of languages, it is merely necessary to utilize a number of devices corresponding to the overall peak load. Often times this will be about the same or only slightly in addition to the peak number of users in a single language, so the overall number of input terminals can be decreased over that which would be required if separate language devices were necessary. Furthermore, there is no need for a terminal processor as required by intelligent terminals, so the overall expense of a text editing system is further reduced.

A preferred implementation of this invention will now be described in conjunction with FIGS. 2, 3, 5, 6A and 6B. It is most readily understood by referring to the response of the text editing system to typical operator actions including the selection of a language and the entry of some representative text characters.

FIG. 5 is a memory map that shows the addresses and contents of representative storage locations in the memory 21. All the addresses and contents are given in symbolic terms in order to simplify the explantion. The assignment of specific numerical addresses and data to symbolic terms in dedicated an time-shared data processing systems is well known to those of ordinary skill in the art.

One set of locations in the memory 21 is a central editor program 50. This program comprises a basic set of instructions for controlling the interaction between the processor and control unit 10 and the various units in the system. A portion of the central editor program 50 is devoted to various interruption routines that respond to the actuation of the keys on a keyboard.

Referring to FIG. 6A and assuming that an operator at text editing station 11A has established communications with the processor and control unit 10, the operator next depresses the GO TO HEAD key 44 in block 30. This is represented as step 100 in 6A. In step 101, the matrix encoder 15 generates a key code that is transferred to the data buffer register 16. As the GO TO HEAD key 44 in block 30 is key 2, the CODE portion of the data buffer register 16 receives the value $002_8$. The timing and control unit 17 then sets the ATTN bit in the status register 20 as shown in step 102 to interrupt the processor and control unit 10.

Once the processor and control unit 10 initiates step 103, it performs some preliminary operations in step 104 to save the contents of various registers and perform other housekeeping operations as is well known in the art. Some representative operations, shown to the left of step 104 in PDP11 machine instructions, load the contents of various registers into a memory stack in the memory 21. In step 105 the key code is transferred from the data buffer register 16 to the processor and control unit 10. Then the ATTN bit in the status register 20 is altered by means of an instruction that transfers data, address and control signals onto an interconnecting bus. An address deocoder 51 in the input unit 12A responds to the address of any location in it (e.g., the address of the status register 20) and alters the contents of that location in accordance with that data. This is represented by step 106. In step 107 the contents from a location in a key code table 52 in the memory 21 (FIG. 5) corresponding to key 2 is obtained. As key 2 is a control key, the interruption routine uses step 110 in FIG. 6 to branch and step 111 to call a function subroutine in an area 53 that begins at a location specified by the contents obtained from the key code table 52. Among the functions performed by the subroutine for the GO TO HEAD key is the shift of the cursor into a header portion of the display.

In further operations, the operator, as previously indicated, may use an assigned default language. Alternatively, the operator uses the cursor control keys 45 to position the cursor at a language selection field to specify another language. This information is stored in a user table 54 (FIG. 5) as a language index and is associated with the user's keyboard.

Assuming now that the operator is entering text and strikes key 34 without depressing the shift key 40 or the super shift key 41, the sequence of events including steps 100 through 107 is repeated. Now however, the interruption routine uses step 110 to branch to step 112 based upon the contents of the selected location in the key code table 52 in FIG. 5. As neither the shift key 40 nor the super shift key 41 is depressed, the SS and SH positions in the data buffer register contain ZEROes. The location in the memory 21 corresponding to key 34 (symbolically addressed as $034_8$) contains a character code for "e" (symbolically LE). The interruption routine converts the character code into a starting address in the character generator 25 shown in FIG. 2. Then, in step 113 this starting address is transferred through the memory multiplexer 23 into the memory 22. The next time the CRT display 13A is refreshed, the display controller 24A retrieves the dot information for "e" and displays that character.

More specifically, in one specific implementation, the character generator 25 stores the dot information in sequences of locations identified by base addresses. The contents of corresponding locations in the key code table 52 are obtained by multiplying each base address by 2 and then adding 1 to obtain an odd value. On the other hand, the address for the initial storage location containing a subroutine is an even number due to the addressing characteristics of PDP11 data processing systems. Thus, it is a simple task to determine whether a location in the key code table 52 identified by the data from an input unit contains a character code that can be transferred immediately to the memory 22 or a subroutine address and to convert any such character code to the appropriate address.

Assuming the operator strikes key 33, the interruption routine branches at step 110 to step 111 because the addressed location in the key code table contains an even number. As this is a variable key, a function subroutine designated as a VAR 33 subroutine is specifically called from a VAR33 location. As shown in FIG. 6B, initially the subroutine identifies the user and keyboard in step 114 and then retrieves the appropriate language index from user table 54 in step 115. This subroutine contains a base address for key 33 (symbolically BASE 33) and uses the language index to alter that address thereby to attain the address of a location in a variable character display table 55. Thus, in step 116 the base address is indexed by the appropriate language index, "11" in the case of French, thereby to identify a location in the variable display table 55 that contains the character code for á. This character code is identical to the character code stored in location $231_8$ in the key code table 52, and it is transferred to the memory 22 associated with the text editing station 11A. The subroutine terminates with step 117 and returns operation to the calling routine; namely, the interruption routine in FIG. 6A. At this point, interruption routine is completed and so it returns control back to the central editor program 50.

If the operator had selected the English language group and struck key 33, the same operation would occur. However, the language index would be "00" so a different location in the variable display table 55 would be identified. The character code TWO for the numeral 2 would be transferred to the memory 22.

The foregoing description has been limited to a specific embodiment. It will be apparent, however, that this invention can be implemented in diverse ways. For example, in FIG. 5 there are discrete subroutines for responding to the variable keys. Yet is also is possible to construct a key code table 52 using a base table for all the fixed keys and short variable key code tables for each potential value of the variable keys in row 42. Then a complete key code table could be constructed for each language group. Although this approach requires additional memory space for the tables, it eliminates the time required to perform variable key subroutines.

Figure 7:
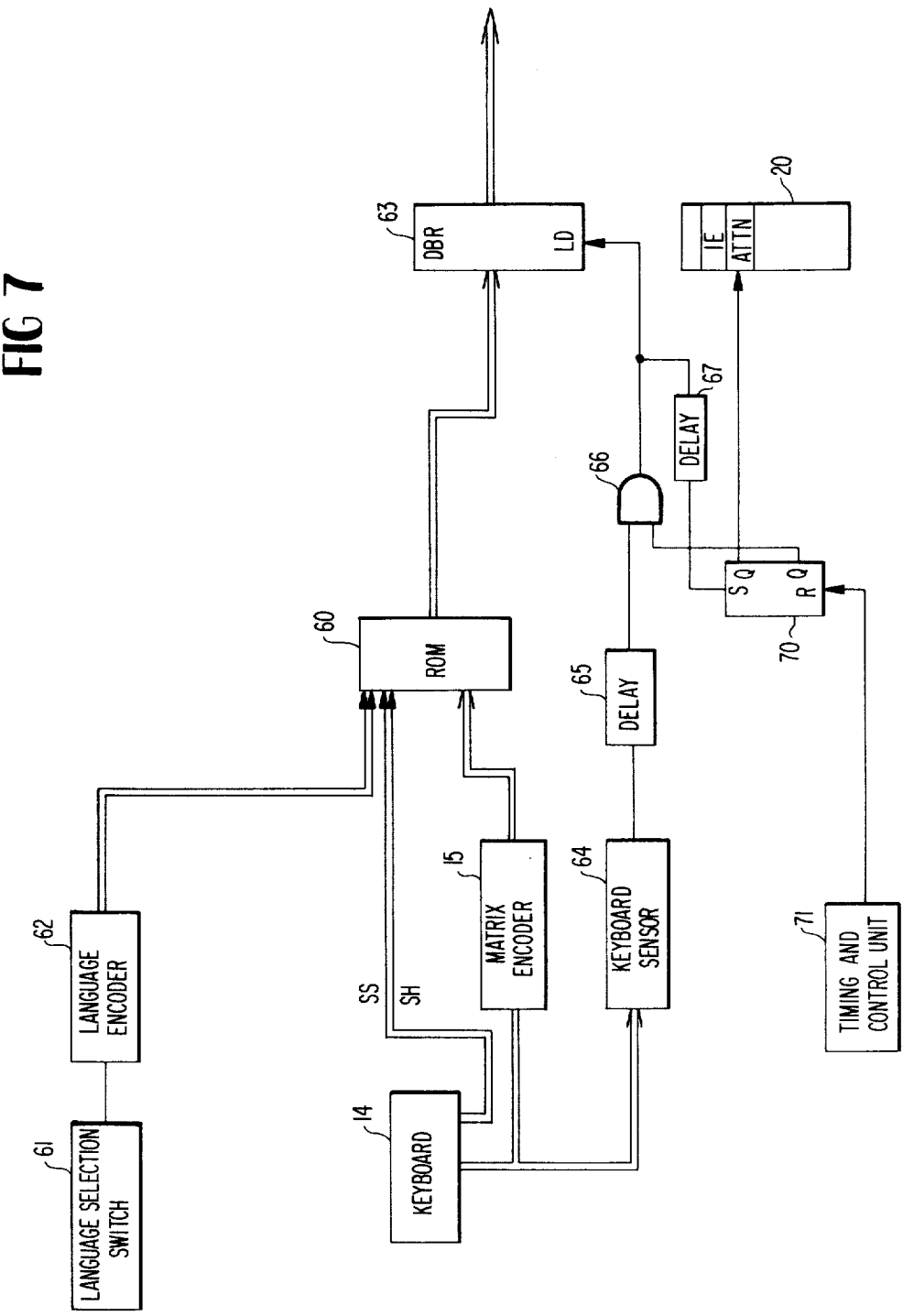
FIG. 7 is a diagram of an alternate embodiment of this invention.

Still another potential implementation of this invention is shown in FIG. 7. In this embodiment of a data input device, the operator strikes the keyboard 14 and a matrix encoder 15 produces a key code that is applied to the address port of a read-only memory 60. Assuming that the keyboard has the configuration shown in FIG. 3, SS and SH signals indicating the actuation of the shift key 40 and super shift 41 are also applied to the address port. The operator also positions a language selection switch 61 to select a particular language. A language encoder 62 then converts the switch position into binary address signals that also are applied to the address port. The read-only memory 60 contains information corresponding to the character codes in each of the locations in the key code table 52 shown in FIG. 5.

Each character code is stored directly in a data buffer register 63 for direct transfer to a corresponding display. Each time the operator strikes the keyboard 14, a keyboard sensor 64 is energized. After an interval established by a delay circuit 65 to enable the address signals and the contents of the corresponding memory location to stabilize, an AND gate 66 loads the character code into the data buffer register (DBR) 63. After a short interval established by a delay circuit 67, the signal from the AND gate 66 directly sets a flip-flop 70 thereby to set the ATTN stage in the status register 20. Setting the flip-flop 70 also disables the AND gate 66 and inhibits any further response to the keyboard 14 until the interruption routine resets the ATTN position by issuing an appropriate resetting instruction. A timing and control circuit 71 responds to such an instruction by directly resetting the flip-flop 70.

The circuitry and operation described with respect to FIGS. 1 through 6B constitute a preferred embodiment of this invention because it provides a more flexible operation. On the other hand, the circuitry in FIG. 7, which would be located in each input terminal, is equally effective for enabling the operator to perform the same functions. Moreover, while FIG. 7 discloses one specific alternate embodiment of this invention, it will be apparent that there are still other variations and modifications that also will incorporate this invention. For example, the foregoing description has been limited to the entry of alphanumeric data and related symbols in several languages. However, the variable keys also can be assigned other technical or special symbols without any need to duplicate those symbols in other keys. It therefore is the intent of the appended claims to cover all such variations and modifications of this invention as come within the true spirit and scope of this invention.

What we claim as new and desire to secure by Letters Patent of the United States is:

1. A terminal for use by an operator of a data processing system, said terminal comprising:
  A. a plurality of fixed data input keys, each said fixed data input key corresponding to a different symbol and having a visual indication of that symbol thereon, certain of the symbol constituting predetermined selectable sets of symbols,
  B. a plurality of variable data input keys,
  C. control means for enabling the operator to select one of the selectable sets of symbols thereby to assign to each said variable data input key a different one of the symbols in the selected set, each symbol in the selected set thereby being assigned to one key of each said fixed data input keys and said variable data input keys, and
  D. generating means responsive to the actuation of any of said fixed and variable data input keys by the operator for generating key identifying signals that are transferred to the data processing system.

2. A terminal as recited in claim 1 wherein said plurality of data input keys are arranged in a plurality of key blocks, one said key block including data input keys for the symbols of a standard typewriter and, as an upper row thereof, said variable data input keys.

3. A terminal as recited in claim 2 wherein said data input keys in said one key block correspond to English language characters, a second key block of said data input keys corresponding to special characters in at least one other language and at least one selectable set of symbols being taken from the special characters in said second key block.

4. A terminal as recited in claim 2 wherein said control means includes a plurality of control keys arranged in another key block that is separated from said first and second key blocks of data input keys.

5. A terminal as recited in claim 1 wherein said generating means includes a matrix encoder responsive to the actuation of a data input key for generating signals identifying that data input key, a data buffer register for storing the signals from said matrix encoder, and timing and control means for transferring the signals from said matrix encoder to said data buffer register, in response to the actuation of said data input keys.

6. A terminal as recited in claim 1 additionally comprising a display screen and means responsive to signals from the data processing system for producing on said screen, in response to the actuation of any said data input key, a symbol corresponding to the symbol assigned to said data input key.

7. A terminal for use by an operator of a data processing system, said terminal comprising:
  A. a frame;

B. a plurality of fixed data input keys, each said fixed data input key being mounted to said frame and corresponding to a different symbol and having a visual indication of that symbol thereon;

C. a plurality of variable data input keys mounted to said frame;

D. replaceable legend means on said frame adjacent to said variable data input keys, said legend means having a plurality of positions thereon, each said position corresponding to one of said variable data input keys and containing of the symbols in a set of symbols on said legend means, the symbol set being one of a plurality of sets;

E. control means for enabling the operator to select the selectable set of symbols on said legend means thereby to assign to each said variable data input key the symbol identified in the corresponding position of said legend means, each symbol in the selected set thereby being assigned to one key of each said fixed data input keys and said variable data input keys, and F. generating means responsive to the actuation of any of said fixed and variable data input keys by the operator for generating key identifying signals that are transferred to the data processing system.

8. A terminal as recited in claim 7 wherein said control means includes a plurality of control keys that designate different control functions, said generating means being responsive to the actuation of any said control key for generating signals that identify said control keys.

9. A terminal as recited in claim 8 wherein said generating means includes a matrix encoder responsive to the actuation of a data input or control key for generating code signals that identify that data input or control key, a data buffer register, and timing and control means responsive to the actuation of any of said data input and control keys for transferring the code signals from said matrix encoder to said data buffer register.

10. A terminal as recited in claim 9 wherein said terminal is adapted for entering upper and lower case alphabetic characters into the data processing system, one of said control keys comprising a shift key and said data buffer register storing a signal corresponding to the state of said shift key.

11. A terminal as recited in claim 7 wherein said data input keys are arranged in a first group corresponding to a first language and a second group including symbols and characters of at least a second language, said data input keys being in said first group being arranged in a plurality of rows corresponding to a standard typewriter configuration in the first language, said top row of data input keys constituting said variable data input keys.

12. A terminal as recited in claim 7 additionally comprising a display screen and means responsive to signals from the data processing system for producing on said display screen, in response to the actuation of any said data input key, a symbol corresponding to the symbol assigned to said data input keys.

13. A text editing system comprising:

A. input means for entering text into said system, said input means including:
  i. a plurality of fixed data input keys, each said fixed data input key corresponding to a different symbol and certain of the symbols constituting predetermined selectable sets of symbols,
  ii. a plurality of variable data input keys,
  iii. control keys for enabling the operator to select one of the selectable sets of symbols thereby to assign to each said variable data input key a different one of the symbols in the selected set, each symbol in the selected set thereby being assigned to one key of each said fixed data input keys and said variable data input keys, and
  iv. input generating means responsive to the actuation of any of said control and data input keys by the operator for generating key identifying signals, B. display means for providing a visual indication of each symbol that is identified by the data input keys, and C. control means including:
  i. identification means responsive to the actuation of said control and fixed and variable data input keys for identifying the key,
  ii. character generating means for producing control signals that produce in said display means symbols corresponding to each of the symbols in the data input keys, and
  iii. conversion means responsive to key identification signals from said input generating means corresponding to said control keys and the key identifying signals for transferring from said character generator to said display means control signals corresponding to an actuated one of said data input keys thereby to produce a corresponding display of the symbol on said display means.

14. A text editing system as recited in claim 13 wherein said plurality of data input keys are arranged in first and second spaced key blocks and said plurality of variable data input keys comprises a row in said first key block that is adjacent to and spaced from said second key block, said input means additionally comprising means for locating a legend adjacent said variable input keys thereby to identify each symbol in a selectable set and the assignment of each symbol to each said variable data input key.

15. A text editing system as recited in claim 13 wherein said character generating means comprises a memory for storing the control signals at predetermined addressed locations therein, said input generating means in said input means including a matrix encoder for generating signal that identify each said data input and control key and said identification means in said control means includes means for converting signals from said matrix encoder into addresses for said character generator means.

16. A text editing system as recited in claim 15 wherein said conversation means includes a memory having a storage table for storing at each of the plurality of identified locations therein an address of said character generating means memory means, each said location in said table corresponding to the key identifying signals and means responsive to the actuation of any of said control and data input keys for obtaining the character generating memory address from said table.

17. A text editing system as recited in claim 16 wherein said input means includes a shift key movable between two positions for providing from each data input key at least two different symbols, said input generating means and said identifying means producing signals indicating the position of said shift key.

* * * * *

UNITED STATES PATENT AND TRADEMARK OFFICE
CERTIFICATE OF CORRECTION

PATENT NO. : 4,124,843
DATED : November 7, 1978
INVENTOR(S) : Harvey G. Bramson et al.

It is certified that error appears in the above-identified patent and that said Letters Patent are hereby corrected as shown below:

Column 2, line 12, "it desirable" should read -- it is desirable --

Column 5, line 18, "orgainzed" should read -- organized --.

Column 6, line 15, "the", second occurrence, should read -- to --.

Column 7, line 34, "explantion" should read -- explanation --.

Column 8, line 2, "deocoder" should read -- decoder --.

Column 9, line 24, "is", first occurrence, should read -- it --.

Column 10, line 22, "symbol" should read -- symbols --.

Signed and Sealed this

Thirteenth Day of November 1979

[SEAL]

Attest:

RUTH C. MASON
Attesting Officer

LUTRELLE F. PARKER
Acting Commissioner of Patents and Trademarks